US012054115B2

(12) United States Patent
Rodgers et al.

(10) Patent No.: US 12,054,115 B2
(45) Date of Patent: Aug. 6, 2024

(54) BUMPER WITH SELECTIVELY ATTACHABLE LIGHT BARS

(71) Applicant: Deist Industries, Inc., Hadley, PA (US)

(72) Inventors: Brody Rodgers, Harrisville, PA (US); Allen Frost, Linesville, PA (US); Jeff Burns, Waterford, PA (US)

(73) Assignee: Deist Industries, Inc.

( * ) Notice: Subject to any disclaimer, the term of this patent is extended or adjusted under 35 U.S.C. 154(b) by 0 days.

(21) Appl. No.: 17/893,339

(22) Filed: Aug. 23, 2022

(65) Prior Publication Data

US 2022/0402450 A1 Dec. 22, 2022

Related U.S. Application Data

(63) Continuation of application No. 17/222,338, filed on Apr. 5, 2021, now Pat. No. 11,433,837.

(51) Int. Cl.
*B60R 19/50* (2006.01)
*B60D 1/52* (2006.01)
*B60D 1/58* (2006.01)

(52) U.S. Cl.
CPC ............... *B60R 19/50* (2013.01); *B60D 1/52* (2013.01); *B60D 1/58* (2013.01); *B60R 2019/505* (2013.01)

(58) Field of Classification Search
CPC ..... B60R 19/50; B60R 2019/505; B60D 1/52; B60D 1/58; B60Q 1/18; B60Q 1/30; B60Q 1/0483
See application file for complete search history.

(56) References Cited

U.S. PATENT DOCUMENTS

| 1,771,319 | A | * | 7/1930 | Schmidt | B60R 19/50 293/142 |
| 6,886,968 | B1 | * | 5/2005 | Hamelink | B60R 9/06 280/491.2 |
| 9,821,616 | B1 | | 11/2017 | Sayers | |
| 9,840,218 | B1 | * | 12/2017 | Wymore | B60R 19/50 |
| 10,513,219 | B1 | * | 12/2019 | Hassler | B60D 1/58 |
| 2004/0156205 | A1 | * | 8/2004 | Pisciotti | B60Q 1/305 362/540 |

(Continued)

OTHER PUBLICATIONS

Buyers Products 1809036 Hitch Plate (Amazon.com, Jun. 30, 2021) https://www.amazon.com/Buyers-Products-1809036-Hitch-Plate/dp/B01CIO6GP8.

(Continued)

*Primary Examiner* — Zheng Song
(74) *Attorney, Agent, or Firm* — Emerson Thomson & Bennett, LLC; Roger D. Emerson

(57) ABSTRACT

Provided in this disclosure is a vehicle bumper having a mounting plate extending between first end and second ends and a first mounting flange formed integrally with the first end of the mounting plate. A second mounting flange is formed integrally with the second end of the mounting plate. A first light bar and a second light bar are provided. A first mating mounting flange is formed integrally with the first light bar, and a second mating mounting flange formed integrally with the second light bar. The mounting plate has a planar mounting surface. The first mating mounting flange is configured for detachable engagement with the first mounting flange. The second mating mounting flange is configured for detachable engagement with the second mounting flange.

20 Claims, 8 Drawing Sheets

(56) References Cited

U.S. PATENT DOCUMENTS

| | | | |
|---|---|---|---|
| 2005/0006874 A1* | 1/2005 | Mrofka | B60R 9/06 |
| | | | 280/482 |
| 2008/0011793 A1* | 1/2008 | Newbill | B62D 43/02 |
| | | | 224/42.21 |
| 2014/0268775 A1* | 9/2014 | Kennemer | F21V 21/145 |
| | | | 362/369 |
| 2016/0167568 A1* | 6/2016 | Salami, Jr. | B60Q 1/0088 |
| | | | 362/543 |
| 2016/0347247 A1* | 12/2016 | Espey | B60Q 1/305 |
| 2017/0114966 A1 | 4/2017 | Mccurdy | |
| 2017/0120838 A1 | 5/2017 | Hare | |
| 2017/0259730 A1* | 9/2017 | Carroll | B60P 3/18 |
| 2017/0334347 A1 | 11/2017 | Wilkins | |
| 2018/0304838 A1* | 10/2018 | Cummings | B60R 19/02 |
| 2019/0126809 A1 | 5/2019 | Wymore | |
| 2020/0332971 A1* | 10/2020 | Paine | F21V 21/16 |
| 2020/0406845 A1* | 12/2020 | Sonoda | B60R 19/50 |

OTHER PUBLICATIONS

Buyers Products 1809030B Hitch Plate, 1 Pack (Amazon.com, Jun. 30, 2021) https://www.amazon.com/Buyers-Products-1809030B-Hitch-Plate/dp/B06ZYMYMM2.

* cited by examiner

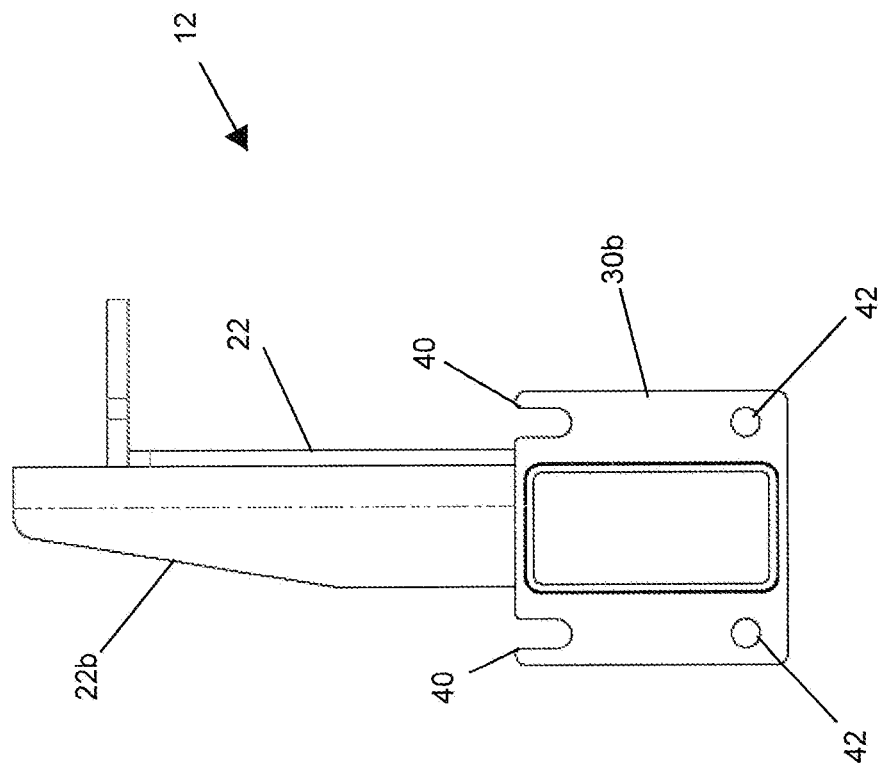

BUMPER WITH SELECTIVELY ATTACHABLE LIGHT BARS

1. BACKGROUND

A. Technical Field

The present invention pertains to the field of bumpers for vehicles. In particular, the present invention relates to the field of customizable bumpers that can be selectively configured by an end user to suit the specific needs of a truck.

B. Description of Related Art

Trucks are typically sold with standard factory components such as bumpers, and can include option packages with additional components that can enable certain specific functions suited to the needs of the end user. However, there are a myriad of specific needs for a variety of different end users. Factory standards and options cannot meet every specific user's needs. There is a market for vehicle customization to accommodate these various needs in which modified components can be provided to improve performance of a vehicle and provide functions not available in standard or optional factory components.

Customizing operations can require personnel to adapt and fabricate their own components for use with a bumper. This can be time consuming and material-intensive and thus expensive to the end user. Also such fabricated components do not necessarily comply with established safety standards. This can result in potential liability in the event of the failure of a component. Moreover, customizing operations often result in a monolithic component that is made for the specific needs at the time of the customer ordering the component. Thus, such components usually cannot be subsequently modified to accommodate any additional changing needs of the end user.

Another problem arises with detachable components that can be attached to a customizable bumper. Such components can be supported by a series of bolts in which a first worker supports the components for alignment against the bumper while a second worker inserts the bolts into the aligned holes. This can be a two-worker procedure and can result in difficulty in aligning the components and also difficulty in inserting the bolts while maintaining alignment.

II. SUMMARY

Provided in this disclosure is a vehicle bumper having a mounting plate extending between first end and second ends and a first mounting flange formed integrally with the first end of the mounting plate. A second mounting flange is formed integrally with the second end of the mounting plate. A first light bar and a second light bar are provided. A first mating mounting flange is formed integrally with the first light bar, and a second mating mounting flange formed integrally with the second light bar. The mounting plate has a planar mounting surface. The first mating mounting flange is configured for detachable engagement with the first mounting flange. The second mating mounting flange is configured for detachable engagement with the second mounting flange.

In one embodiment, the first and second light bars are attached to the first and second ends of the mounting plate, respectively. The first and second light bars extend along an axis and the mounting plate extends between its first and second ends parallel to the axis. A support member extends between the first and the second ends of the mounting plate. The support member is formed integrally with the mounting plate, the first mounting flange and the second mounting flange. In one embodiment, the support member is hollow and has a generally rectangular cross section. In one embodiment, the mounting surface has an array of mounting holes. In another embodiment, the mounting surface has a pair of D rings.

In one embodiment, each of the first mounting flange and the first mating mounting flange has a plurality of apertures that receive bolts to attach the first mounting flange to the first mating mounting flange. Each of the second mounting flange and the second mating mounting flange has a plurality of apertures that receive bolts to attach the second mounting flange to the second mating mounting flange. In another embodiment, the plurality of apertures in the first mounting flange includes a pair of slots that extend to an outer edge of the first mounting flange, and the plurality of apertures in the second mounting flange include a pair of slots that extend to an outer edge of the first mounting flange.

In one embodiment, the first light bar has one or more holes designed to receive and mount at least one customizable light. The second light bar also has one or more holes designed to receive and mount at least one customizable light.

A vehicle bumper method is also provided having the steps of providing a mounting plate extending between first end and second ends, providing the mounting plate with a planar mounting surface having one or more of an array of mounting holes and a pair of D rings. The steps further include providing a first mounting flange formed integrally with the first end of the mounting plate and providing a second mounting flange formed integrally with the second end of the mounting plate. The steps additionally include providing a first light bar, providing a second light bar, along with providing a first mating mounting flange formed integrally with the first light bar and providing a second mating mounting flange formed integrally with the second light bar. The steps also include configuring the first mating mounting flange to be selectively engageable to the first mounting flange to attach the first light bar to the first end of the mounting plate and configuring the second mating mounting flange to be selectively engageable to the second mounting flange to attach the second light bar to the second end of the mounting plate.

The present method for a vehicle bumper also includes steps of configuring the first mating mounting flange to be selectively disengageable from the first mounting flange to detach the first light bar from the first end of the mounting plate and configuring the second mating mounting flange to be selectively disengageable from the second mounting flange to detach the second light bar from the second end of the mounting plate. The method additionally includes providing a support member that extends between the first and the second ends of the mounting plate and forming the support member integrally with the mounting plate, the first mounting flange and the second mounting flange.

The present method for a vehicle bumper additionally includes steps of providing the first light bar with at least one hole designed to receive and mount at least one customizable light and providing the second light bar with at least one hole designed to receive and mount at least one customizable light. The method also includes configuring the first and second light bars to extend along an axis when they are attached to the first and second ends of the mounting plate, respectively and configuring the mounting plate to extend between its first and second ends parallel to the axis.

In yet another embodiment, a vehicle bumper includes a mounting plate extending between first end and second ends, along with a first mounting flange formed integrally with the first end of the mounting plate and a second mounting flange formed integrally with the second end of the mounting plate. A support member is provided that extends between the first and the second ends of the mounting plate and is formed integrally with the mounting plate, the first mounting flange and the second mounting flange. A first light bar and a a second light bar are provided, where a first mating mounting flange is formed integrally with the first light bar and a second mating mounting flange is formed integrally with the second light bar. The mounting plate has a planar mounting surface having one or more of an array of mounting holes and a pair of D rings. The first mating mounting flange is configured for detachable engagement with the first mounting flange and the second mating mounting flange is configured for detachable engagement with the second mounting flange.

In one embodiment, the first and second light bars are attached to the first and second ends of the mounting plate, respectively. The first and second light bars extend along an axis. The mounting plate extends between its first and second ends parallel to the axis. In another embodiment, each of the first mounting flange and the first mating mounting flange has a plurality of apertures that receive bolts to attach the first mounting flange to the first mating mounting flange and each of the second mounting flange and the second mating mounting flange has a plurality of apertures that receive bolts to attach the second mounting flange to the second mating mounting flange.

In a further embodiment, the mounting surface has an array of mounting holes and a pair of D rings. In another embodiment, the first light bar has at least one hole designed to receive and mount at least one customizable light and the second light bar has at least one hole designed to receive and mount at least one customizable light. In yet another embodiment, the plurality of apertures in the first mounting flange includes a pair of slots that extend to an outer edge of the first mounting flange. The plurality of apertures in the second mounting flange includes a pair of slots that extend to an outer edge of the first mounting flange. The support member is hollow and has a generally rectangular cross section.

According to one aspect, the present invention provides a vehicle bumper that can be customized to accommodate the needs of specific users.

According to another aspect, the present invention provides a vehicle bumper that improves performance of a vehicle and provides functions not available in standard or optional factory components.

According to still another aspect, the present invention provides a vehicle bumper that can be customized without fabricating or adapting components.

According to yet another aspect, the present invention provides a vehicle bumper that can be customized without the expense associated with a time consuming and material-intensive fabricating process.

According to a further aspect, the present invention provides a vehicle bumper that complies with established safety standards.

According to another further aspect, the present invention provides a customizable vehicle bumper that can be subsequently modified to accommodate any changing needs of the end user.

Other benefits and advantages of this invention will become apparent to those skilled in the art to which it pertains upon reading and understanding of the following detailed specification.

III. BRIEF DESCRIPTION OF THE DRAWINGS

The disclosed vehicle bumper may take physical form in certain parts and arrangement of parts, embodiments of which will be described in detail in this specification and illustrated in the accompanying drawings which form a part hereof and wherein:

FIG. 8 is a side view of the elongated body portion with mounting plate of the vehicle bumper in accordance with the present invention.

IV. DETAILED DESCRIPTION

Figure 1:
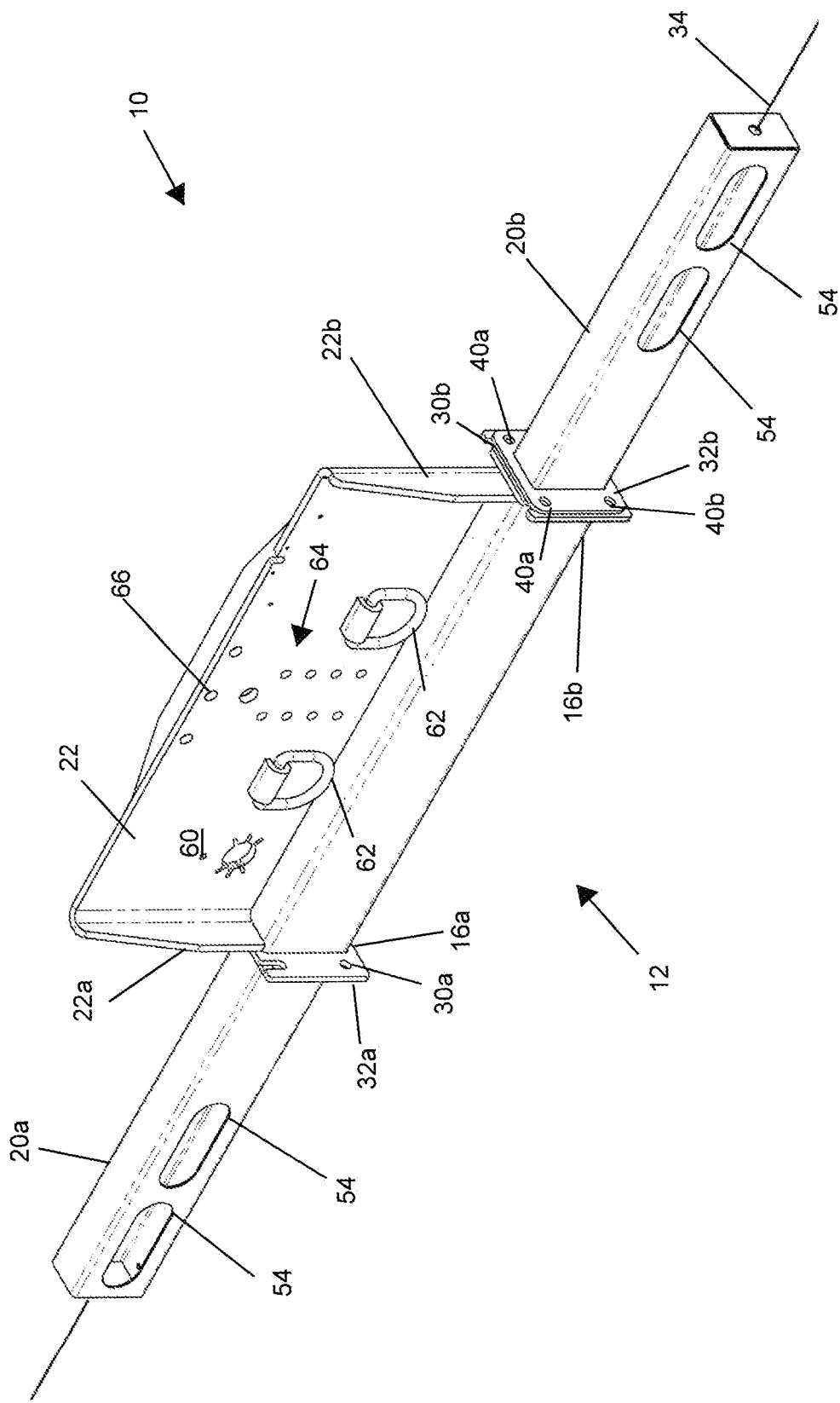
FIG. 1 is a perspective view of the vehicle bumper in accordance with an exemplary embodiment of the present invention.
Figure 2:
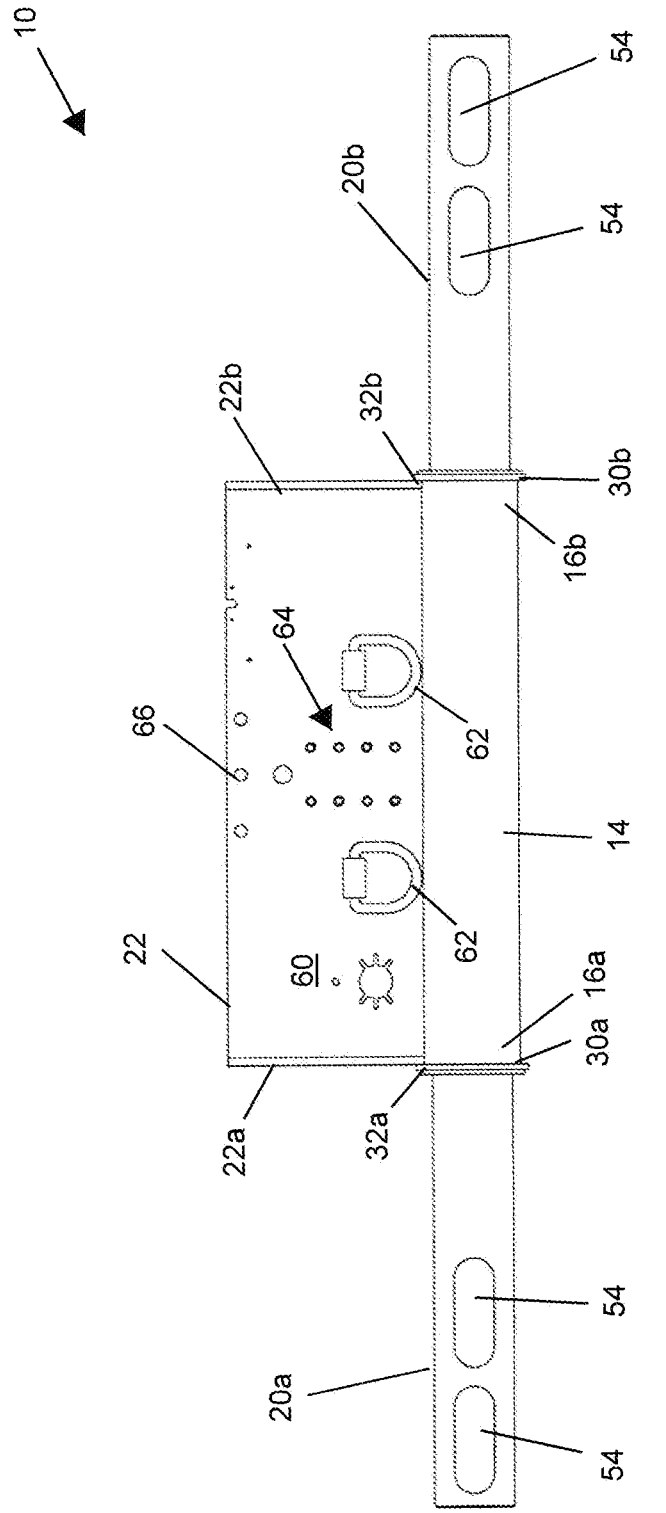
FIG. 2 is a frontal view of the vehicle bumper in accordance with the exemplary embodiment of the present invention.
Figure 3:
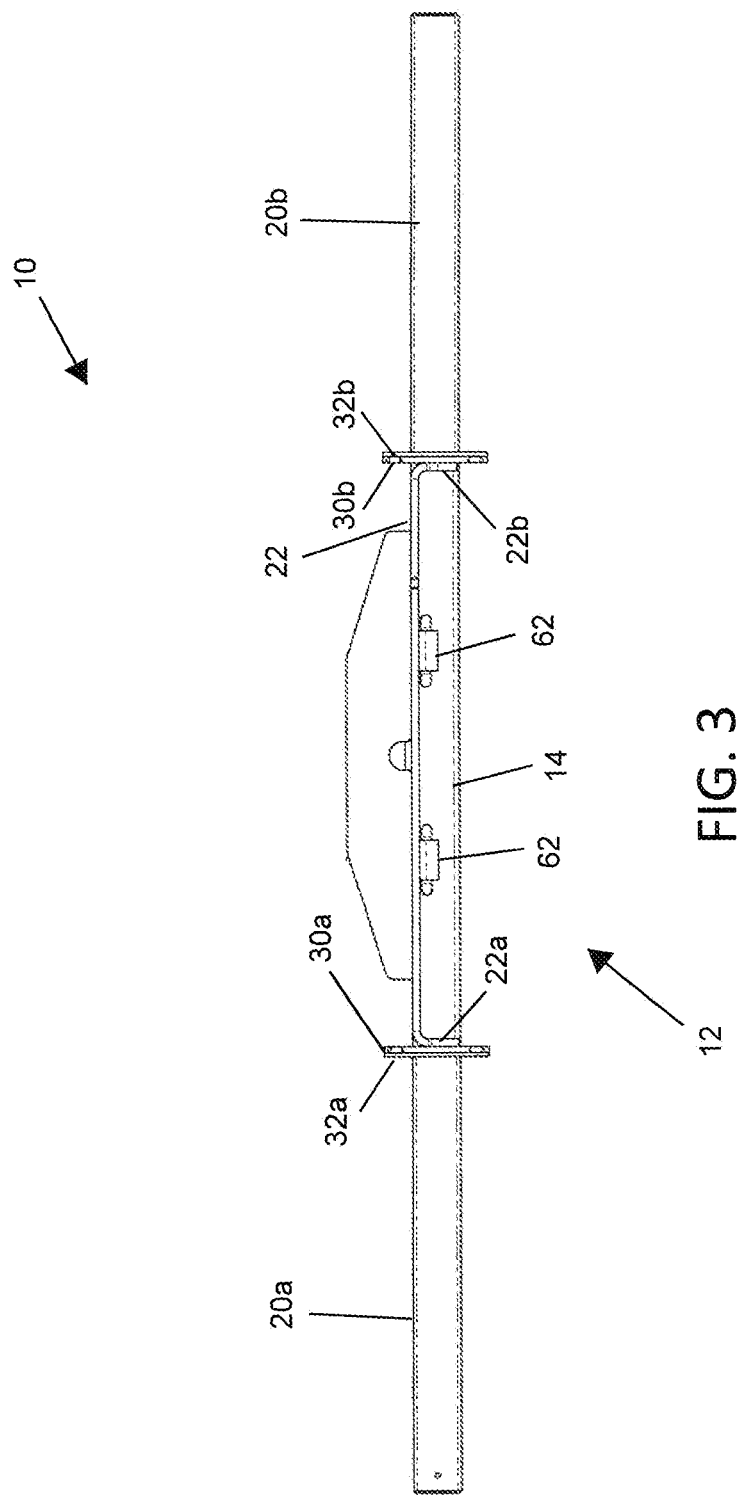
FIG. 3 is a top view of the vehicle bumper in accordance with the exemplary embodiment of the present invention.
Figure 4:
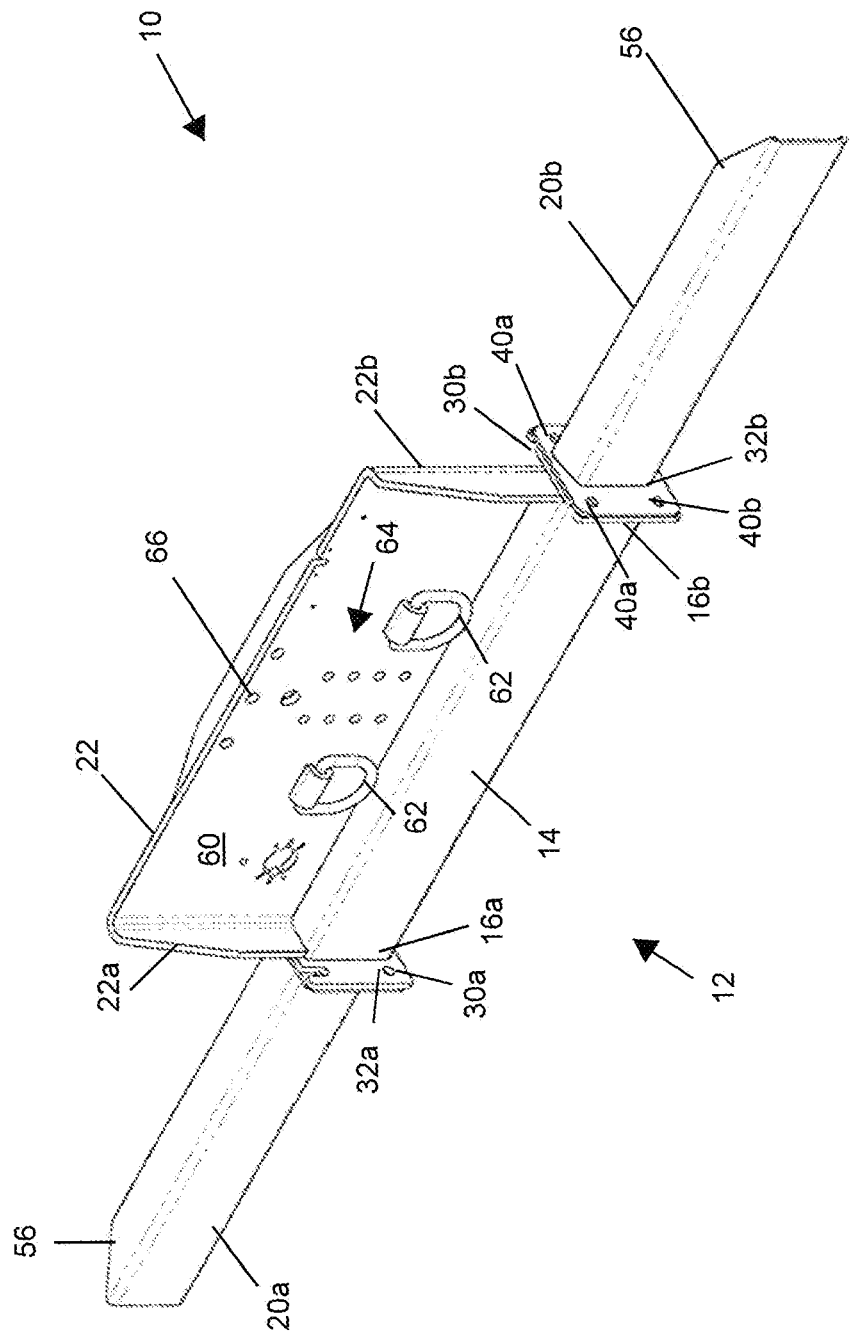
FIG. 4 is a perspective view of the vehicle bumper in accordance with an alternate exemplary embodiment of the present invention.
Figure 5:
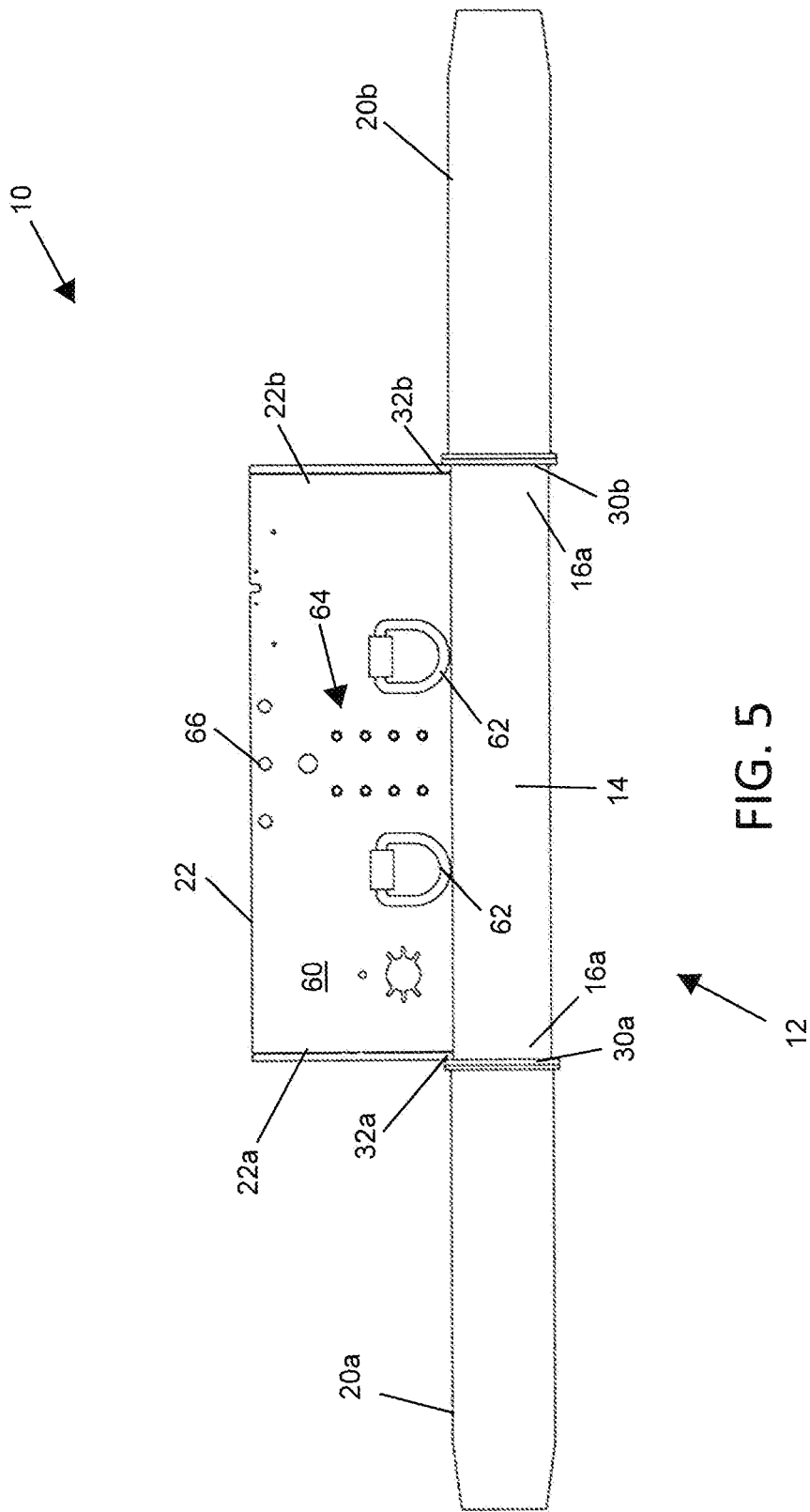
FIG. 5 is a frontal view of the vehicle bumper in accordance with the alternate exemplary embodiment of the present invention.
Figure 6:
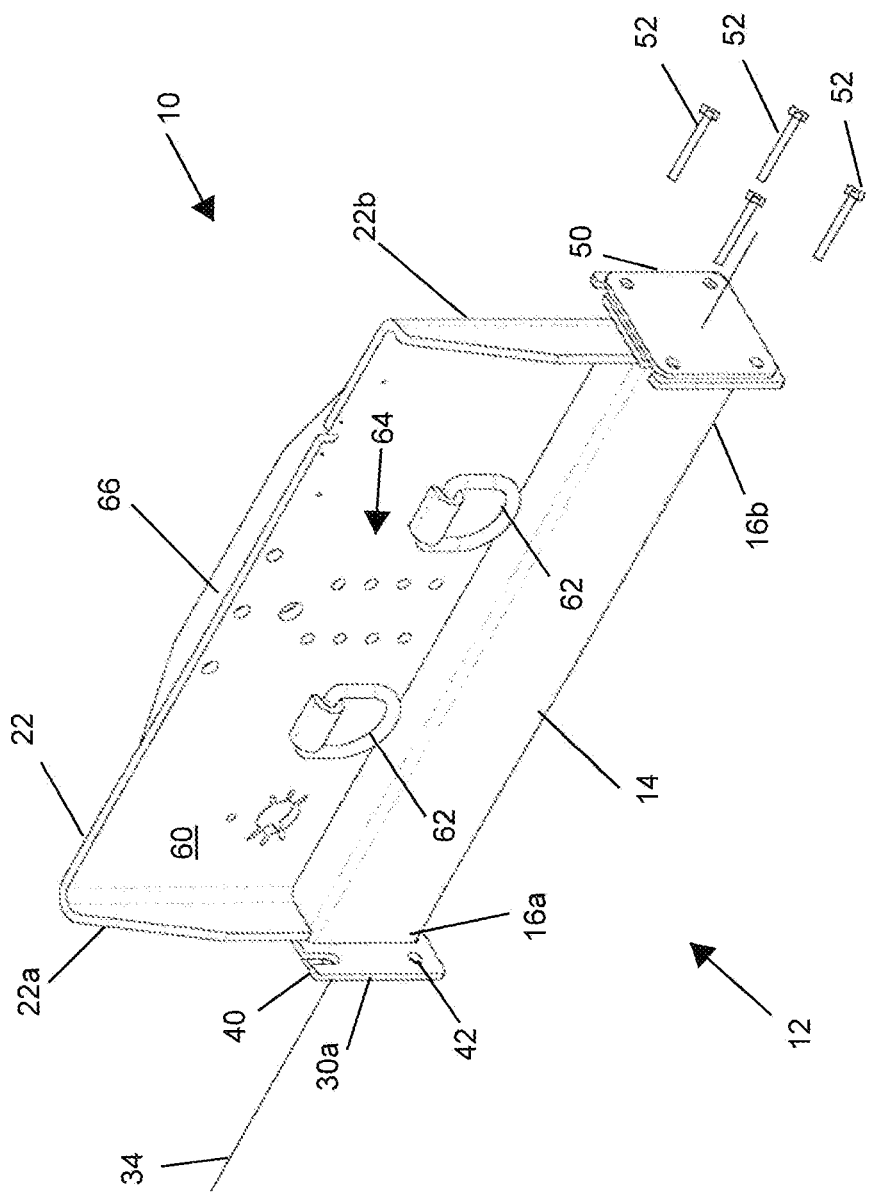
FIG. 6 is a perspective view of the elongated body portion with mounting plate of the vehicle bumper in accordance with the present invention.
Figure 7:
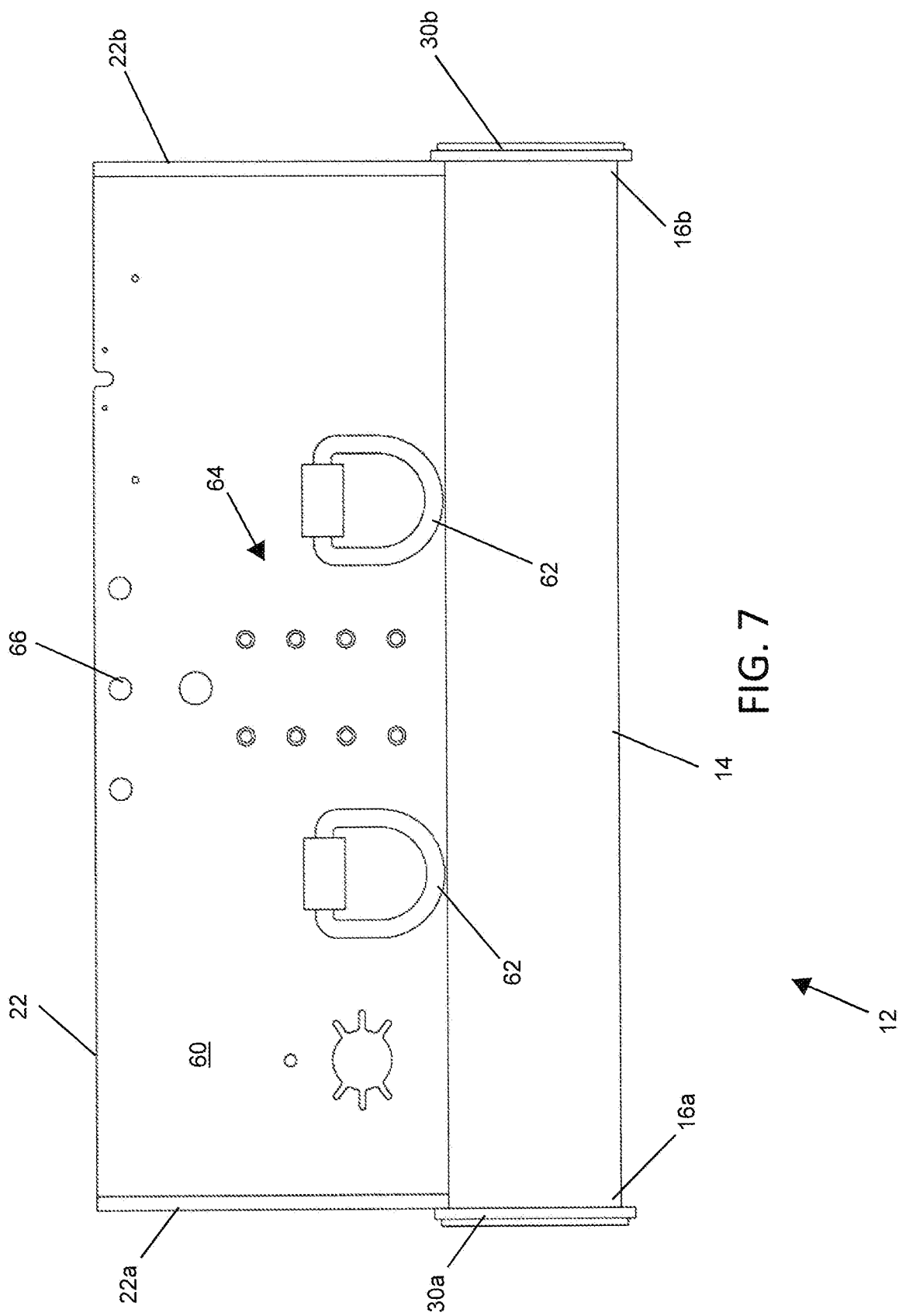
FIG. 7 is a frontal view of the elongated body portion with mounting plate of the vehicle bumper in accordance with the present invention.

Referring now to the drawings wherein the showings are for purposes of illustrating embodiments of the article only and not for purposes of limiting the same, and wherein like reference numerals are understood to refer to like components:

FIGS. 1, 2, and 3 depict the vehicle bumper 10 in accordance with an exemplary embodiment. FIGS. 4 and 5 depict the vehicle bumper 10 in accordance with an alternate exemplary embodiment. In both embodiments, the bumper 10 includes a main bumper 12 having an elongated body portion 14 with a first end 16*a* and a second end 16*b*. The vehicle bumper 10 also includes a first detachable light bar 20*a* and a second detachable light bar 20*b*. FIGS. 6, 7, and 8 specifically show the main bumper 12 alone, without the light bars 20*a*, 20*b*.

As shown in FIGS. 1-8, both embodiments include a mounting plate 22 formed integrally with the elongated body portion 14 of the main bumper 12. The mounting plate 22 includes a planar mounting surface 60 extending away from the elongated body portion 14. The mounting plate 22 can be integrally formed with the elongated body portion 14 via welding or other suitable type of bonding or other securement. Various additional aspects of the mounting plate 22 will be disclosed in greater detail hereinbelow.

With reference to FIGS. 1-8, particularly FIGS. 6-8, the elongated body portion 14 includes a first mounting flange 30*a* and a second mounting flange 30*b*. The first and second mounting flanges 30*a*, 30*b* are formed integrally with the respective first and second ends 16*a*, 16*b* of the elongated body portion 14. The mounting flanges 30a, 30b can be integrally formed with the elongated body portion 14 via welding or other suitable type of bonding or other securement.

With particular reference to FIGS. 1-5, the first detachable light bar 20a and the second detachable light bar 20b are both detachable from the main bumper 12 and include mating mounting flanges 32a, 32b for attaching to the main bumper 12. The first light bar 20a includes a first mating mounting flange 32a and the second light bar 20b includes a second mating mounting flange 32b. These first and second mating mounting flanges 32a, 32b are configured for detachable engagement with the respective first and second mounting flanges 16a, 16b of the main bumper.

As shown in FIGS. 1-8, particularly FIGS. 6-8, the elongated body portion 14 of the main bumper 12 has a generally rectangular shape and thereby includes a generally rectangular cross section. The first and second mounting flanges 30a, 30b are formed as respective first and second rectangular peripheral portions that are perpendicular to an axis 34 running through the center of the length direction of the elongated body portion 14 and thus the entire vehicle bumper 10. The mating mounting flanges 32a, 32b on the first and second light bars 20a, 20b are similarly formed as respective first and second rectangular peripheral portions that are perpendicular to the axis 34 of the vehicle bumper 10. In this manner the first and second mounting flanges 30a, 30b of the elongated body portion 14 have first and second facing sides that abut first and second facing sides on the respective first and second mating peripheral portions on the respective first and second mating mounting flanges 32a, 32b of the first and second light bars 20a, 20b.

As particularly seen in FIGS. 6-8, apertures are formed at each respective corner of the first and second mounting rectangular peripheral portions of the first and second mounting flanges 30a, 30b. These apertures are formed in the mounting flanges 30a, 30b in order to receive bolts extending through from the respective first and second mating mounting flanges 32a, 32b of the first and second light bars 20a, 20b. While any suitable shape apertures could be formed in the mounting flanges 30a, 30b, in the preferred embodiment the apertures particularly include a pair of slots 40 into which a pair of bolts are slid from the respective first and second mating mounting flanges 32a, 32b. The apertures also include a pair of bolt holes 42 into which another pair of bolts are extended from the respective first and second mating mounting flanges 32a, 32b. In the preferred embodiment, each of the pair of slots 40 are vertical slots formed near the corners inwards from a top edge of the respective mounting flange 30a, 30b, where the "top edge" is the upwardly vertical edge when the bumper is installed in its operative position.

As follows from the FIGS. 1 and 4, the slots 40 greatly facilitate the assembly of the light bars 20a, 20b to the main bumper 12. The mating mounting flanges 32a, 32b of the light bars 20a, 20b each include bore holes for receiving bolts. In operation, two bolts are inserted into the two top bore holes 40a formed along the top edge of the mating mounting flanges 32a, 32b. When the light bars 20a, 20b are abutted to the main bumper 12, the bolts are then readily dropped into the vertical slots 40 of the mounting flanges 16a, 16b, so that the mating mounting flanges 32a, 32b are readily aligned with the mounting flanges 30a, 30b. The bolts can then be secured with suitable nuts to hold the light bars 20a, 20b in place against the main bumper 12. Afterwards, two more bolts can be inserted into the two bottom bore holes 40b formed along the bottom edge of the mating mounting flanges 32a, 32b, which are already aligned with the mounting flanges 30a, 30b, and are then readily secured with nuts. Thus, the vertical slots 40 facilitate and simplify a light bar assembly operation, which can be performed by one person instead of requiring one person to hold the light bar in alignment with the main bumper while another person inserts bolts in four corner holes.

As indicated in FIG. 6, a customizable bumper design may be contemplated in which one or both light bars 20a, 20b remain detached from the main bumper 12. In this instance, one or both of the first and second mounting flanges 30a, 30b are enclosed by a flat plate 50 for covering the respective flange 30a, 30b if the respective detachable light bar 20a, 20b is detached. The flat plate 50 is secured with bolts 52, which can be the same bolts used to secure the light bar. The flat plate 50 prevents dirt and moisture from entering into the hollow elongated body portion 14.

With reference to FIGS. 1-5, the first and second detachable light bars 20a, 20b can be of any suitable configuration for installing one or more lights to the vehicle bumper 10. In the preferred embodiment the light bars 20a, 20b are elongated members that each extend away from the main bumper 12 along the axis 34 of the elongated body portion 14. As shown particularly in the exemplary embodiment of FIGS. 1-3, one or both of the first and second detachable light bars 20a, 20b include one or more holes 54 for receiving and mounting at least one customizable light to the vehicle bumper 12. As shown particularly in the alternate exemplary embodiment of FIGS. 4 and 5, one or both of the first and second detachable light bars 20a, 20b include a slanted portion 56, formed on the end of the light bars 20a, 20b, where the end of the light bar includes chamfered edges tapered from the front to the back for aesthetics and ergonomic safety.

As generally shown in FIGS. 1-8, the mounting plate 22 includes two angled portions 22a, 22b, perpendicular to the plane of the mounting surface 60 of the mounting plate 22, for providing mechanical strength and secure attachment to the elongated body portion 14. The mounting surface 60 of the mounting plate 22 preferably includes a pair of standard D rings 62 for attaching a trailer safety chain. The mounting surface 60 of the mounting plate 22 also preferably includes an array of mounting holes 64 formed at different positions upon the mounting surface 60 for selectively bolting an interchangeable trailer hitch or pintle type hitch (not shown) onto the bumper at a desired position, enabling a selection of hitch heights and types to suit the needs of the end user. The mounting surface can also include a series of additional holes 66 for mounting any other selected items, such as a license plate or any other accessories.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A replacement vehicle bumper for use with an associated vehicle having an original bumper, the replacement vehicle bumper, comprising:
   a mounting plate extending between first end and second ends;
   a first mounting flange formed integrally with the first end of the mounting plate;
   a second mounting flange formed integrally with the second end of the mounting plate;

a first light bar;
a second light bar;
a first mating mounting flange formed integrally with the first light bar; and
a second mating mounting flange formed integrally with the second light bar;
wherein:
1) the mounting plate has a planar mounting surface;
2) the first mating mounting flange is configured for detachable engagement with the first mounting flange; and
3) the second mating mounting flange is configured for detachable engagement with the second mounting flange; and
4) the replacement vehicle bumper is designed to replace the original bumper.

2. The replacement vehicle bumper of claim 1, wherein when the first and second light bars are attached to the first and second ends of the mounting plate, respectively:
the first and second light bars extend along an axis; and
the mounting plate extends between its first and second ends parallel to the axis.

3. The replacement vehicle bumper of claim 1, further comprising:
a support member extending between the first and the second ends of the mounting plate; and
wherein the support member is formed integrally with the mounting plate, the first mounting flange and the second mounting flange.

4. The replacement vehicle bumper of claim 3, wherein the support member:
is hollow; and
has a generally rectangular cross section.

5. The replacement vehicle bumper of claim 1, wherein: the mounting surface has an array of mounting holes.

6. The replacement vehicle bumper of claim 1, wherein: the mounting surface has a pair of D rings.

7. The replacement vehicle bumper of claim 1, wherein:
each of the first mounting flange and the first mating mounting flange has a plurality of apertures that receive bolts to attach the first mounting flange to the first mating mounting flange; and
each of the second mounting flange and the second mating mounting flange has a plurality of apertures that receive bolts to attach the second mounting flange to the second mating mounting flange.

8. The replacement vehicle bumper of claim 7, wherein:
the plurality of apertures in the first mounting flange comprise a pair of slots that extend to an outer edge of the first mounting flange; and
the plurality of apertures in the second mounting flange comprise a pair of slots that extend to an outer edge of the first mounting flange.

9. The replacement vehicle bumper of claim 1, wherein:
the first light bar has at least one hole designed to receive and mount at least one customizable light; and
the second light bar has at least one hole designed to receive and mount at least one customizable light.

10. A vehicle bumper method, comprising the steps of:
providing a replacement vehicle bumper comprising:
a mounting plate extending between first end and second ends and having planar mounting surface having at least one of:
1) an array of mounting holes; and
2) a pair of D rings;
a first mounting flange formed integrally with the first end of the mounting plate;
a second mounting flange formed integrally with the second end of the mounting plate;
a first light bar;
a second light bar;
a first mating mounting flange formed integrally with the first light bar;
a second mating mounting flange formed integrally with the second light bar;
configuring the first mating mounting flange to be selectively engageable to the first mounting flange to attach the first light bar to the first end of the mounting plate;
configuring the second mating mounting flange to be selectively engageable to the second mounting flange to attach the second light bar to the second end of the mounting plate; and
designing the replacement vehicle bumper to selectively replace an original bumper on an associated vehicle.

11. The method for providing a replacement vehicle bumper of claim 10, further comprising the steps of:
configuring the first mating mounting flange to be selectively disengageable from the first mounting flange to detach the first light bar from the first end of the mounting plate; and
configuring the second mating mounting flange to be selectively disengageable from the second mounting flange to detach the second light bar from the second end of the mounting plate.

12. The method for providing a replacement vehicle bumper of claim 10, further comprising the steps of:
providing a support member that extends between the first and the second ends of the mounting plate; and
forming the support member integrally with the mounting plate, the first mounting flange and the second mounting flange.

13. The method for providing a replacement vehicle bumper of claim 10, further comprising the steps of:
providing the first light bar with at least one hole designed to receive and mount at least one customizable light; and
providing the second light bar with at least one hole designed to receive and mount at least one customizable light.

14. The method for providing a replacement vehicle bumper of claim 10, further comprising the steps of:
configuring the first and second light bars to extend along an axis when they are attached to the first and second ends of the mounting plate, respectively; and
configuring the mounting plate to extend between its first and second ends parallel to the axis.

15. A replacement vehicle bumper for use with an associated vehicle having an original bumper, the replacement vehicle bumper, comprising:
a mounting plate extending between first end and second ends;
a first mounting flange formed integrally with the first end of the mounting plate;
a second mounting flange formed integrally with the second end of the mounting plate;
a support member that:
1) extends between the first and the second ends of the mounting plate; and
2) is formed integrally with the mounting plate, the first mounting flange and the second mounting flange;
a first light bar;
a second light bar;
a first mating mounting flange formed integrally with the first light bar; and a second mating mounting flange formed integrally with the second light bar;

wherein:
1) the mounting plate has a planar mounting surface having:
    (a) an array of mounting holes; and
    (b) a pair of D rings;
2) the first mating mounting flange is configured for detachable engagement with the first mounting flange;
3) the second mating mounting flange is configured for detachable engagement with the second mounting flange; and
4) the replacement vehicle bumper is designed to replace the original bumper.

16. The replacement vehicle bumper of claim 15, wherein when the first and second light bars are attached to the first and second ends of the mounting plate, respectively:

the first and second light bars extend along an axis; and
the mounting plate extends between its first and second ends parallel to the axis.

17. The replacement vehicle bumper of claim 16, wherein:

each of the first mounting flange and the first mating mounting flange has a plurality of apertures that receive bolts to attach the first mounting flange to the first mating mounting flange; and each of the second mounting flange and the second mating mounting flange has a plurality of apertures that receive bolts to attach the second mounting flange to the second mating mounting flange.

18. The replacement vehicle bumper of claim 17, wherein the mounting surface has:

an array of mounting holes; and
a pair of D rings.

19. The replacement vehicle bumper of claim 18, wherein:

the first light bar has at least one hole designed to receive and mount at least one customizable light; and
the second light bar has at least one hole designed to receive and mount at least one customizable light.

20. The replacement vehicle bumper of claim 19, wherein:

the plurality of apertures in the first mounting flange comprise a pair of slots that extend to an outer edge of the first mounting flange;
the plurality of apertures in the second mounting flange comprise a pair of slots that extend to an outer edge of the first mounting flange; and
the support member:
1) is hollow; and
2) has a generally rectangular cross section.

* * * * *